Nov. 28, 1967     P. P. PARSONS     3,354,584

VEHICLE BODY TRIM ATTACHMENT

Filed March 23, 1966

INVENTOR.
Peter P. Parsons
BY
Herbert Furman
ATTORNEY

3,354,584
VEHICLE BODY TRIM ATTACHMENT
Peter P. Parsons, Birmingham, Mich., assignor to General Motors Corporation, Detroit, Mich., a corporation of Delaware
Filed Mar. 23, 1966, Ser. No. 536,772
6 Claims. (Cl. 49—377)

This invention relates to a vehicle body trim attachment and more particularly to an adjustable vehicle body trim panel.

One feature of this invention is that it provides a vehicle body closure trim panel which mounts a closure panel weatherstrip and which can be adjustably mounted on a vehicle body closure to accdrately locate the weatherstrip with respect to the closure window. Another feature of this invention is that the trim panel is adjustably mounted on a wall of the closure which defines an edge portion of a closure panel opening which receives the closure window. A further feature of this invention is that a support member is adjustably mounted on the wall and cooperating means on this member and the panel are interengageable with each other to accurately locate the trim panel weatherstrip with respect to the closure window. Yet another feature of this invention is that the wall which defines an edge portion of the opening is disposed laterally of a generally vertically disposed closure inner wall and the trim panel covers and is secured to the inner wall of the closure.

These and other features of the trim panel attachment of this invention will be readily apparent from the following specification and drawings wherein.

Figure 1:
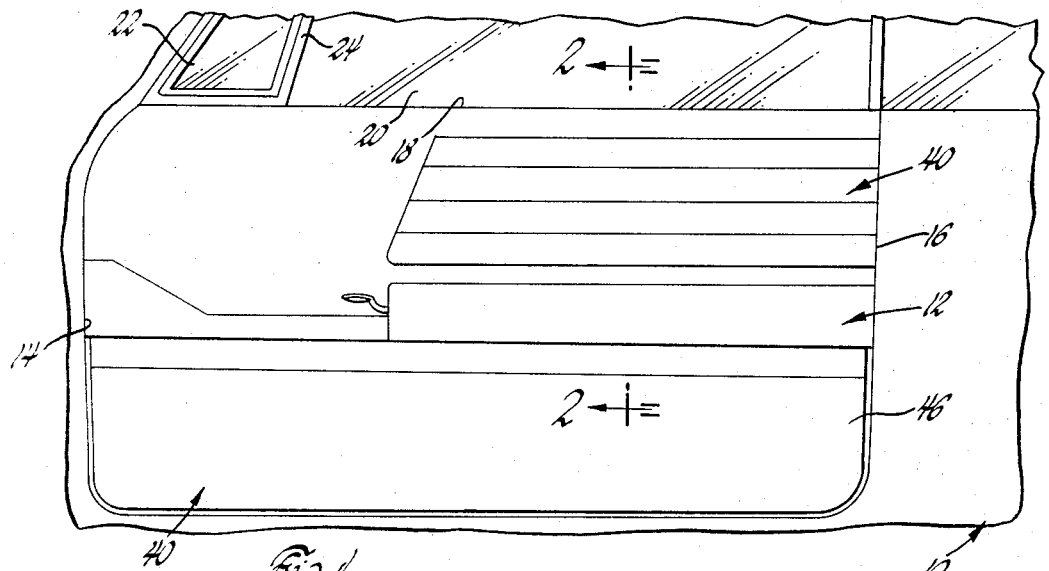
FIGURE 1 is a partial elevational view of a vehicle body having a closure and a trim panel attachment according to this invention.

Referring now to the drawings, a vehicle body designated generally 10 includes a front door 12 which is hingedly mounted adjacent its forward edge 14 on the body 10 for movement between a closed position, as shown, and an open position, not shown. Suitable latch means are provided between the rear swinging edge 16 of door 12 and the adjacent body structure to latch the door 12 to the body in closed position. Door 12 includes a door window opening 18, the rear portion of which is opened and closed by a vertically movable door window 20 and the forward portion of which is opened and closed by a ventilation window 22 is pivotally mounted within a fixed frame 24 of door 12 for swinging movement about a generally disposed vertical axis between a closed position as shown and an open position transversely of the frame 24.

Figure 2:
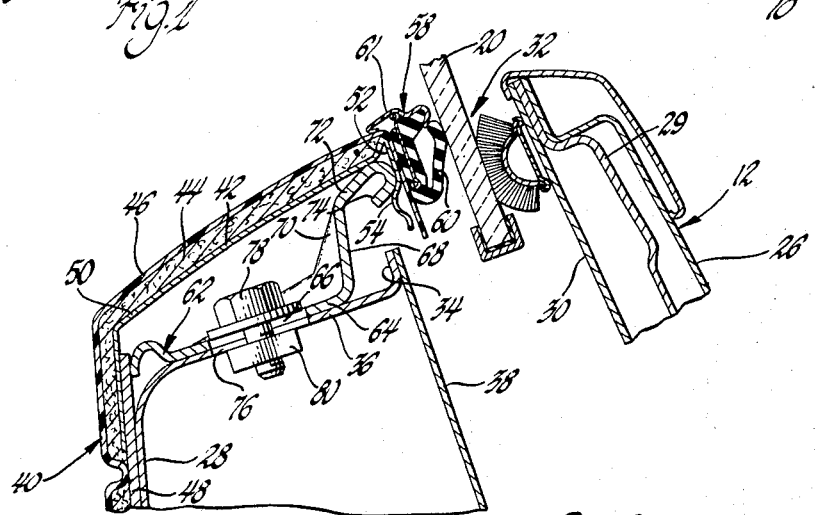
FIGURE 2 is an enlarged sectional view taken generally along the plane indicated by line 2—2 of FIGURE 1.

As shown in FIGURE 2, the door 12 includes an outer panel 26 and an inner panel 28. The upper edge of panel 26 is welded to the flanges of reinforcement members 29 and 30, with this multiple flange structure defining the outer edge portion of an opening 32 in the door 12 to permit passage of the window 20 between open and closed positions. The inner edge portion of the opening 32 is defined by the flange 34 of the upper wall 36 of panel 28. Flange 34 is joined to a reinforcement member 38. Wall 36 extends laterally of the major portion of the inner panel and generally normal to the path of movement of the window 20.

The front and rear walls of the door 12 and the lower wall thereof are provided by joined flanges of the inner and outer panels.

A trim pad or panel designated generally 40 is provided to cover the inner panel 28 and the wall 36 thereof. The trim panel includes a foundation member 42 which is of suitable rigid material such as metal, an intermediate pad 44 which is secured to the member 42, and an outer decorative trim fabric 46 secured to the pad 44. An intermediate member 48 may be provided between the foundation member 42 and the inner panel 28 of the door. The upper laterally extending portion 50 of the trim pad overlies the wall 36 in spaced relationship thereto. A lateral flange 52 of member 42 is disposed generally parallel to the plane of movement of the window 20 and is provided with a longitudinally extending rib or bead 54. The juncture between the flange 52 and the major portion of member 42 is in the form of a rib or bead and the padding 44 terminates at this rib or bead. The trim fabric 46 extends over this rib or bead and is secured to the outer face of the flange 52.

A weatherstrip 58 has its reinforced body stapled as shown or otherwise secured to the flange 52 in engagement with the fabric 46. The weatherstrip 58 includes a deflectable lip 60 which is intended to seal against the window 20 in any position thereof. A decorative scalp molding 61 is secured to the body of the weatherstrip and overlies the upper edge portion of the trim panel 40 to conceal the joint between the weatherstrip and the trim panel.

It can be seen that if the weatherstrip 58 is located too remote from the window 20, then the lip 60 may not seal against the window. Likewise, if the weatherstrip 58 is located too close to the window 20, then either the molding 61 or the body of the weatherstrip may bind the window. Thus, there is a desired optimum relationship between the weatherstrip 58 and the window 20.

Figure 3:
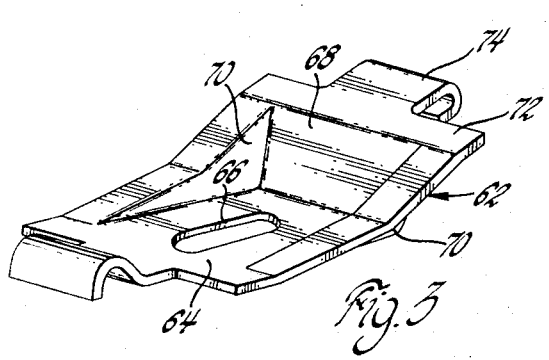
FIGURE 3 is an enlarged perspective view of a portion of FIGURE 2.

In order to accurately locate the weatherstrip 58 with respect to the window 20, the portion 50 of the trim panel is adjustably mounted on the wall 36 of the inner panel. Spaced along wall 38 are a plurality of mounting or support members designated generally 62. As shown in FIGURE 3, each of the members 62 includes a base portion 64 provided with an elongated slot 66, an end wall 68 and flanged side walls 70 which are joined to the base wall and to the end wall. Wall 68 includes an angled flange 72 and a return bent flange 74 extends from the wall 72 and is located generally coplanar therewith. The wall 36 is provided with a series of slots 76 which are spaced longitudinally along the wall and extend normal to the plane of movement of the window 20. The slots 76 are generally of the same width as the slots 66 and a bolt 78 extends through these slots with the shank of the bolt being of a diameter generally equal to the width of both slots. A nut 80 threaded on the bolt adjustably locates the members 62 laterally of the plane of movement of the window 20. Preferably, at least two of the members 62 are provided spaced longitudinally of the wall 36 although more may be provided if necessary or desired.

The window 20 is supported on the door 12 by suitable window regulator mechanism and both the window and the mechanism are mounted on the door prior to the trim pad 40 being mounted thereon. Once the window 20 is mounted on the door, the location of the window within the opening 32 is fixed. Thereafter, the members 62 can be mounted on the wall 36. By use of a suitable gauge or tool, the space between the bight of flange 74 and the inner surface of the window 20 can be set and the bolts 78 thereafter threaded into the nuts 80 to fix the position of the members 62 with respect to the window 20. Then, the bead 54 of flange 52 of the trim panel is moved over and behind the bights of each of the flanges 74 and the trim panel moved into engagement with the inner panel 28 of the door. The inner panel is, of course, secured to the door in any conventional manner, such as by concealed nails or screws. Since the bights of flanges 74 have been accurately located with respect to the inner surface of the window 20, the weatherstrip 58 is thus accurately located with respect to the window 20 to ensure adequate sealing and yet easy movement of the window 20 with respect to the lip 60 of the weatherstrip.

The distance between the flange 52 and the trim pad is arranged so as to be normally less than the least possible distance between the flange 34 and the inner panel 28. The portion 50 of the trim pad can flex relative to the trim pad to accommodate the various special relationships required in production usage of this structure.

It will be noted that the base portion 64 of the member 62 includes a return bent downwardly opening extension which overlies the wall 36 adjacent juncture of this wall with the inner panel 28. When the trim panel 40 is mounted on the door 12, the intermediate member 48 engages the return bent extension as shown in FIGURE 2. This further aids in locating the flange 52 since, if necessary, this flange can swing relative to the member 42 so as to be accurately located with respect to the window 20.

Thus, this invention provides an improved trim panel attachment.

I claim:

1. The combination comprising, a vehicle body closure including a wall defining an edge portion of an opening in said closure, a closure panel movable through said opening, a trim panel extending over said wall to adjacent said opening, a support member located between said trim panel and said wall, means adjustably mounting said member on said wall in predetermined spaced relationship to said closure panel, cooperating means on said support member and said trim panel engageable with each other to adjustably locate the edge portion of said trim panel with respect to said closure panel, and a weatherstrip mounted on said trim panel edge portion and located thereby for engagement with said closure panel.

2. The combination recited in claim 1 wherein said support member includes a portion thereof projecting toward said closure panel and said trim panel edge portion is engageable with said support member edge portion to locate said trim panel edge portion with respect to said closure panel.

3. The combination recited in claim 1 wherein a plurality of support members are located on said wall and said trim panel extends over said support members in covering relationship, said cooperating means of said trim panel being located adjacent the edge portion thereof.

4. The combination recited in claim 1 wherein said cooperating means includes a flange on said support member extending toward said closure panel and a flange on the edge portion of said trim panel engageable with said support member flange and means for holding said flanges in engagement with each other.

5. The combination recited in claim 1 wherein said cooperating means includes projections on said trim panel and said support member located in the path of each other and means on said trim panel and closure for holding said projections in engagement with each other.

6. The combination recited in claim 1 wherein said wall extends laterally from the upper edge of a closure inner panel, said support member is adjustably mounted on said wall and includes a flange portion projecting toward said closure panel, said trim panel covering said inner panel and extending over said wall and having a flanged edge portion engageable with said support member flange portion, said trim panel being secured to said inner panel to hold said flange portions in engagement with each other.

References Cited
UNITED STATES PATENTS

| | | | |
|---|---|---|---|
| 2,266,801 | 12/1941 | Reid | 49—377 |
| 2,330,675 | 9/1943 | Brown | 52—718 XR |
| 2,536,895 | 1/1951 | West | 49—377 XR |

OTHER REFERENCES

G.M.C., German Allowed Application 1080420, April 1960.

KENNETH DOWNEY, *Primary Examiner.*